(12) United States Patent
Nace et al.

(10) Patent No.: US 11,185,083 B2
(45) Date of Patent: Nov. 30, 2021

(54) METHODS OF REDUCING OR ELIMINATING PATHOGENIC BACTERIA

(71) Applicant: Birko Corporation, Henderson, CO (US)

(72) Inventors: Gary L. Nace, Claude, TX (US); Terry L. McAninch, Westminster, CO (US); Victor M. Reusch, Arvada, CO (US); Elis M. Owens, Littleton, CO (US)

(73) Assignee: Birko Corporation, Henderson, CO (US)

( * ) Notice: Subject to any disclaimer, the term of this patent is extended or adjusted under 35 U.S.C. 154(b) by 0 days.

(21) Appl. No.: 17/118,576

(22) Filed: Dec. 10, 2020

(65) Prior Publication Data

US 2021/0169094 A1    Jun. 10, 2021

Related U.S. Application Data

(63) Continuation of application No. 16/443,646, filed on Jun. 17, 2019, which is a continuation-in-part of application No. 15/941,880, filed on Mar. 30, 2018, now Pat. No. 10,834,933, which is a continuation of application No. 12/806,317, filed on Aug. 10, 2010, now abandoned, which is a continuation-in-part of application No. 12/151,826, filed on May 9, 2008, now abandoned.

(60) Provisional application No. 61/274,282, filed on Aug. 14, 2009, provisional application No. 61/070,453, filed on Mar. 22, 2008, provisional application No. 60/928,941, filed on May 11, 2007.

(51) Int. Cl.
*A23B 4/12* (2006.01)
*A23B 4/30* (2006.01)
*A23B 4/28* (2006.01)

(52) U.S. Cl.
CPC ............... *A23B 4/12* (2013.01); *A23B 4/28* (2013.01); *A23B 4/30* (2013.01)

(58) Field of Classification Search
CPC ............ A23B 4/12; A23B 4/28; A23B 4/30
USPC ..................................................... 426/332
See application file for complete search history.

(56) References Cited

U.S. PATENT DOCUMENTS 5,234,703 A * 8/1993 Guthery .............. A23B 4/18
                                                    134/25.3
5,980,375 A   11/1999 Anderson et al.
(Continued)

FOREIGN PATENT DOCUMENTS

CN   204317383     2/2015
EP   0013042       7/1980
(Continued)

OTHER PUBLICATIONS

Izat, A. L. et al. J. Food Quality. 13: 295-306 (Year: 1990).*
(Continued)

*Primary Examiner* — Hamid R Badr
(74) *Attorney, Agent, or Firm* — Ballard Spahr LLP

(57) ABSTRACT

Disclosed are methods for killing or reducing the incidence of pathogenic bacteria, comprising contacting the bacteria with a PURAC CL 21/80 solution (1-2.5% by weight) comprising lactic acid in an amount ranging from about 0.43% to 1.23% by weight and citric acid in an amount ranging from about 0.29% to about 0.88% by weight. In some aspects, the pathogenic bacteria can be present on a meat product.

11 Claims, 1 Drawing Sheet

(56) References Cited

U.S. PATENT DOCUMENTS

| | | | |
|---|---|---|---|
| 6,183,807 | B1 | 2/2001 | Gutzmann et al. |
| 6,262,038 | B1 | 7/2001 | Pierce et al. |
| 6,326,042 | B1 | 12/2001 | Iannotti et al. |
| 6,455,086 | B1 | 9/2002 | Trinh et al. |
| 6,867,233 | B2 | 3/2005 | Roselle et al. |
| 6,964,788 | B2 | 11/2005 | Phebus et al. |
| 8,722,123 | B2 | 5/2014 | Doyle et al. |
| 10,834,933 | B2 | 11/2020 | Nace et al. |
| 2005/0153032 | A1 | 7/2005 | Hilgren et al. |
| 2005/0202120 | A1 | 9/2005 | Liu et al. |
| 2012/0052527 | A1 | 3/2012 | Brooks et al. |
| 2014/0106040 | A1 | 4/2014 | Dodd |
| 2014/0272041 | A1 | 9/2014 | Mcaninch et al. |

FOREIGN PATENT DOCUMENTS

| | | |
|---|---|---|
| KR | 100374541 | 3/2004 |
| WO | WO2008/010874 | 1/2008 |
| WO | WO2010/008899 | 1/2010 |
| WO | WO2011/079081 | 6/2011 |
| WO | WO2016/036244 | 3/2016 |
| WO | WO2017050928 | 3/2017 |

OTHER PUBLICATIONS

Bautista, et al., J. Food Microbiol. 34: 279-292 (1997).
Laury, A. M. J. Food Protection. 72: 2208-2211 (2009) (Year: 2009).
Carlson et al., Comparison of Antimicrobial Efficacy of Multiple Beef Hide Decontamination Strategies to Reduce Levels of *Escherichia coli* O157:H7 and *Salmonella*; Journal of Food Protection, vol. 71. No. 11, 2008, pp. 2223-2227.
Castillo et al., Lactic Acid Sprays Reduce Bacterial Pathogens on Cold Beef Carcass Surfaces and in Subsequently Produced Ground Beef; Journal of Food Protection, vol. 64, No. 1, 2011, pp. 58-62.
Dorsa et al., Effects of Acetic Acid, Lactic Acid and Trisodium Phosphate on the Microflora of Refrigerated Beef Carcass Surface Tissue Inoculated with *Escherichia coli* O157:H7, Listeria innocua, and Clostridium sporogenes; Journal of Food Protection, vol. 60, No. 6, 1997, pp. 619-624.
Dorsa et al., Long-Term Effect of Alkaline, Organic Acid, or Hot Water Washes on the Microbial Profile of Refrigerated Beef Contaminating with Bacterial Pathogens after Washing; Journal of Food Protection, vol. 61, No. 3, 1998, pp. 300-306.
Giroux et al., ABSTRACT Combined Effect of Ascorbic Acid and Gamma Irradiation on Microbial and Sensorial Characteristics of Beef Patties during Refrigerated Storage; J. Agric. Food Chem., 2001, 49 (2), pp. 919-925.
Hamby et al., Spray-chilling and Carcass Decontamination Systems Using Lactic and Acetic Acid; Meat Science 21 (1987) 1-14.
Harris et al., Validation of the Use of Organic Acids and Acidified Sodium Chlorite To Reduce *Escherichia coli* 0157 and *Salmonella typhimurium* in Beef Trim and Ground Beef in a Simulated Processing Environment; Journal of Food Protection, vol. 69, No. 8, 2006, pp. 1802-1807.
Ita et al., Intracellular PH and Survival of Listeria monocytogenes Scott A in Tryptic Soy Broth Containing Acetic, Lactic, Citric, and Hydrochloric Acids; Journal of Food Production, vol. 54 No. 1, pp. 15-19 (Jan. 1991).
Osthold, et al., 'Improving the storage life of carcasses by treating their surfaces with an acid spray', Fleishwirtschaft, 64 (1984) 828, quoted on p. 627, in Lactic Acid, chap. 22, Bogaert, J-C., Naidu, A.S., p. 613-636 Natural Food Antimicrobial Systems, Naidu, A.S. ed., CRC Press, 2000.
Phillips, C. A. The effect of citric acid, lactic acid, sodium citrate and sodium citrate, alone and in combination with nisin on the growth of Arcobacter butzleri, Lett. appl. Microbiol. 29(1999) 424-428.

Ransom et al., Comparison of Intervention Technologies for Reducing *Escherichia coli* O157:H7 on Beef Cuts and Trimmings; Food Protection Trends, vol. 23, No. 1, pp. 24-34.
Smulders et al., Review: Lacitic acid: considerations in favour of its acceptance as a meat decontamininat, Journal of Food Technology (1986) 21, 419-436.
Van Der Marel, G.M., et al. 'Bacteriological quality of broiler carcasses as affected by in-plant lactic acid decontamination', Int. J. of Food Microb. 6 (1988) 31-42.
Van Der Marel, et al., Effect of Lactic acid treatment during processing on Sensory Quality and lactic acid content of fresh boiler chickens, Int. J. Food Sci. and Technol. 24 (1989) 11-16.
Waterman et al., Acid-Sensitive Enteric Pathogens Are Protected from Killing under Extremely Acidic Conditions of pH 2.5 when They Are Inoculated onto Certain Solid Food Sources; Appl. Environ. Microbiol. 1998, 64(10):3882.
Desmond, E.M., et al., Effect of Lactic and Citric acid on low-value Beef used for Emulsion-type meat products, LWT Food Sci. and Tech. 34 (2001) 374-379.
Tamblyn, Bactericidal Activity of Organic Acids Against *Salmonella typhimurium* Attached to Broiler Chicken Skin, Journal of Food Proteins, 1997, pp. 629-633, vol. 60, No. 6.
PURAC® CL 21 / 80 Product Data, Rev. No. 1/4301,http://web.archive.org/web/20061113052028/http:l/www.purac.com/ufc/file2/purac_sites/monique/4f97e85e3abac3b50a88566e0899a080/pu/CL_21_80.pdf, printed Mar. 17, 2011, 1 pg.
Doesburg, Barry, Strong Performance by Weak Acids; How to Keep Your Foods Safe and Sharp, Food & Beverage Asia, Apr./May 2006, pp. 50-55.
9 C.F.R. §§ 416.3 and 416.4, 9 CFR Ch. III (Jan. 1, 2007 Edition), pp. 630 and 606.
International Search Report for International Application No. PCT/US08/63217, dated Aug. 4, 2008, 3 pgs.
Written Opinion of the International Searching Authority for International Application No. PCT/US08/63217, dated Aug. 4, 2008, 6 pgs.
International Search Report for International Application No. PCT/US08/63211, dated Jul. 30, 2008, 3 pgs.
Written Opinion of the International Searching Authority for International Application No. PCT/US08/63211, dated Jul. 30, 2008, 7 pgs.
Evaluation of 2.5% Beefxide™ and 5.0% lactic Acid as a Surface Decontaminate for Chilled Beef Surfaces, IEH laboratories & Consulting Group, which was finalized on Mar. 26, 2009, and conducted by IEH Laboratories & Consulting Group, Lake Forst Park, WA 98155; 14 pgs.
Nazer, A. I. et al. Food Microbial. 22: 391-398 (2005) (Year: 2005).
Purac CL21/80 Fact Sheet 2016.
Phillips (1999) The Effect of Citric Acid, Lactic Acid, Sodium Citrate, and Sodium Lactate, Alone and in Combination with Nisin, on the Growth of Arcobacter Butzleri; Ltrs in Appl. Microbiology; 29, 424-428.
Siragusa (1995) The Effectiveness of Carcass Decontamination Systems for Controlling the Presence of Pathogens on the Surfaces of Meat Animal Carcasses, J. Food Safety, 15:229-238.
Purac CL 21/80 Product Data, Rev. No. 1/4301 (undated).
Bilgili (1998) Broiler Skin Color as Affected by Organic Acids: Influence of Concentration and Methods Application; Poultry Science 77: 751-757.
Kang (2002) Effects of Organic Acids on Microbial Populations and *Salmonella typhimurium* in Pork Loins.
Vasseur (1999) "Effect of Osmotic, Alkaline, Acid or Thermal Stresses on the Growth and Inhibition of Listeria Monocytogenes," J of App Microbiology 89: 469-476.
Buddy's Natural Chicken Invoice 2006.

\* cited by examiner

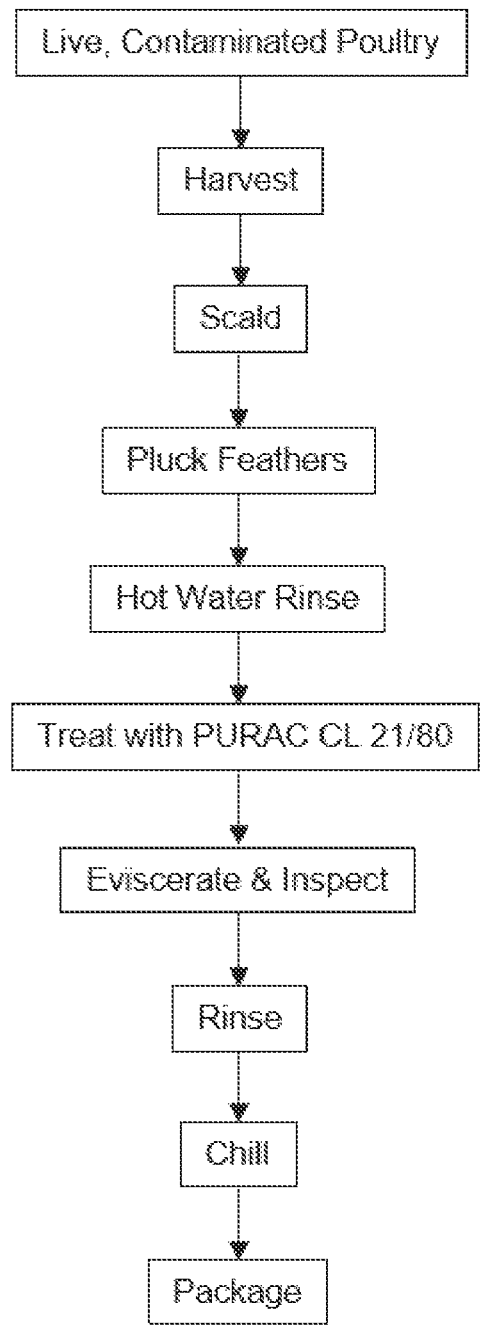

METHODS OF REDUCING OR ELIMINATING PATHOGENIC BACTERIA

CROSS-REFERENCE TO RELATED APPLICATIONS

This application is a continuation of U.S. patent application Ser. No. 16/443,646, filed Jun. 17, 2019, which is a continuation-in-part of U.S. patent application Ser. No. 15/941,880, filed Mar. 30, 2018, now U.S. Pat. No. 10,834,933, which is a continuation of U.S. patent application Ser. No. 12/806,317, filed Mar. 30, 2018, which claims priority to U.S. Provisional Application No. 61/274,282, filed Aug. 14, 2009, and which is a continuation-in-part of U.S. patent application Ser. No. 12/151,826, filed May 9, 2008, which claims priority to U.S. Provisional Application No. 61/070,453, filed Mar. 22, 2008, and U.S. Provisional Application No. 60/928,941, filed May 11, 2007. Each of these documents is incorporated by reference in their entirety.

BACKGROUND

Food safety is an important concern, particularly with respect to meats such as poultry and other non-poultry meats. Uncooked meat products are susceptible to contamination with pathogenic bacteria. Two examples are *Salmonella* and *E. coli*. During processing, meats are conventionally treated with antimicrobial chemicals such as sodium chlorite, peracetic acid, acidified calcium sulfate, chlorine bleach, or another processing aid approved by the U.S. Department of Agriculture (USDA). Conventional processing methods, however, are often ineffective at reducing the incidence of pathogenic bacteria.

SUMMARY

In one aspect, disclosed is a method of killing pathogenic bacteria comprising contacting the bacteria with a solution of PURAC CL 21/80. The solution of PURAC CL 21/80 can comprise lactic acid in an amount ranging from about 0.43% to 1.23% by weight and citric acid in an amount ranging from about 0.29% to about 0.88% by weight.

In a further aspect, disclosed is a method of reducing pathogenic bacteria contamination on meat comprising treating the meat with a solution of PURAC CL 21/80. The solution of PURAC CL 21/80 can comprise lactic acid in an amount ranging from about 0.43% to 1.23% by weight and citric acid in an amount ranging from about 0.29% to about 0.88% by weight.

In a still further aspect, disclosed is a method of killing *Salmonella* comprising contacting the *Salmonella* with a solution of PURAC CL 21/80. The solution of PURAC CL 21/80 can comprise lactic acid in an amount ranging from about 0.43% to 1.23% by weight and citric acid in an amount ranging from about 0.29% to about 0.88% by weight.

BRIEF DESCRIPTION OF THE DRAWINGS

The accompanying drawing, which is incorporated in and constitutes part of this specification and together with the description, serves to explain the principles of the disclosure.

FIG. 1 is a process flow diagram illustrating an exemplary aspect of processing meat, e.g., poultry, according to a disclosed method.

DETAILED DESCRIPTION

In one aspect, disclosed is a method of killing pathogenic bacteria. The method comprises contacting the bacteria with a solution of PURAC CL 21/80. The solution of PURAC CL 21/80 can comprise lactic acid in an amount ranging from about 0.43% to 1.23% by weight and citric acid in an amount ranging from about 0.29% to about 0.88% by weight. The pathogenic bacteria can be *Salmonella, E. coli*, or a combination thereof. According to one aspect, the pathogenic bacteria (e.g., *Salmonella, E. coli*, or a combination thereof) can be present on a meat, e.g., poultry.

In a further aspect, disclosed is a method of reducing pathogenic bacteria contamination on meat comprising treating the meat with a solution of PURAC CL 21/80, wherein the solution of PURAC CL 21/80 comprises lactic acid in an amount ranging from about 0.43% to 1.23% by weight and citric acid in an amount ranging from about 0.29% to about 0.88% by weight. The pathogenic bacteria can be *Salmonella, E. coli*, or a combination thereof.

In a still further aspect, disclosed is a method of killing *Salmonella* comprising contacting the *Salmonella* with a solution of PURAC CL 21/80, wherein the solution of PURAC CL 21/80 comprises lactic acid in an amount ranging from about 0.43% to 1.23% by weight and citric acid in an amount ranging from about 0.29% to about 0.88% by weight. In one aspect, the *Salmonella* can be present on a meat product.

PURAC CL 21/80 is a commercially-available product, sold by Purac America, Inc., Lincolnshire, Ill., among others. PURAC CL 21/80 comprises lactic acid in an amount ranging from about 43% to about 49% by weight and citric acid in an amount ranging from about 29% to about 35% by weight. When applied to pathogenic bacteria (e.g., *Salmonella* or *E. coli*) or a meat product such as poultry or beef contaminated with pathogenic bacteria, PURAC CL 21/80 can be diluted to a solution comprising from about 1% to about 2.5% by weight of PURAC CL 21/80. Such a solution of PURAC CL 21/80 is surprisingly and unexpectedly effective at killing or reducing the incidence of pathogenic bacteria, including pathogenic bacteria present on meat such as poultry or beef.

Because PURAC CL 21/80 comprises lactic and citric acid in amounts ranging from 43-49% and 29-35% by weight, respectively, the weight ratios of lactic acid to citric acid in the PURAC 21/80 product can range from about 1.2:1 (lactic acid:citric acid) to about 1.7:1 (lactic acid:citric acid). Thus, the diluted solutions of PURAC CL 21/80 (1-2.5% by weight) can also comprise a range of from about 1.2:1 (lactic acid:citric acid) to about 1.7:1 (lactic acid:citric acid), by weight. In one aspect, the diluted solutions of PURAC CL 21/80 (1-2.5% by weight) can comprise a range of from about 1.48:1 (lactic acid:citric acid) to about 1.4:1 (lactic acid:citric acid), by weight.

In a further aspect, the solution of PURAC 21/80 can be diluted to 1.8% to 2% by weight of PURAC 21/80. Thus, the 1.8% diluted solution can comprise from about 0.77% lactic acid by weight to about 0.88% lactic acid by weight, and 0.52% citric acid by weight to about 0.63% citric acid by weight. Similarly, the 2% diluted solution can comprise from about 0.86% lactic acid by weight to about 0.98% lactic acid by weight, and 0.58% citric acid by weight to about 0.70% citric acid by weight. Such a solution can be applied to a meat product such as poultry or beef, to reduce the incidence of pathogenic bacteria, including *Salmonella, E. coli*, or a combination thereof.

The table below lists specific, non-limiting examples of PURAC CL 21/80 and solutions of PURAC CL 21/80 diluted to 1% by weight, 1.5% by weight, 2% by weight, and 2.5% by weight. The respective amounts of lactic acid and citric acid, as well as lactic acid:citric acid ratios are shown for each example. The diluted solutions described in the table below can be used to reduce or kill pathogenic bacteria and can be applied to a meat product such as poultry or beef, to reduce the incidence of pathogenic bacteria on the meat, including *Salmonella*, *E. coli*, or a combination thereof.

| PURAC CL 21/80 | | PURAC CL 21/80 (1%) | | PURAC CL 21/80 (1.5%) | | PURAC CL 21/80 (2%) | | PURAC CL 21/80 (2.5%) | | Lactic |
|---|---|---|---|---|---|---|---|---|---|---|
| Lactic Acid | Citric Acid | Lactic Acid | Citric Acid | Lactic Acid | Citric Acid | Lactic Acid | Citric Acid | Lactic Acid | Citric Acid | Acid:Citric Acid |
| 43% | 29% | 0.43% | 0.29% | 0.65% | 0.44% | 0.86% | 0.58% | 1.08% | 0.73% | 1.48:1 |
| 43% | 30% | 0.43% | 0.30% | 0.65% | 0.45% | 0.86% | 0.60% | 1.08% | 0.75% | 1.43:1 |
| 43% | 31% | 0.43% | 0.31% | 0.65% | 0.47% | 0.86% | 0.62% | 1.08% | 0.78% | 1.39:1 |
| 43% | 32% | 0.43% | 0.32% | 0.65% | 0.48% | 0.86% | 0.64% | 1.08% | 0.80% | 1.34:1 |
| 43% | 33% | 0.43% | 0.33% | 0.65% | 0.50% | 0.86% | 0.66% | 1.08% | 0.83% | 1.30:1 |
| 43% | 34% | 0.43% | 0.34% | 0.65% | 0.51% | 0.86% | 0.68% | 1.08% | 0.85% | 1.26:1 |
| 43% | 35% | 0.43% | 0.35% | 0.65% | 0.53% | 0.86% | 0.70% | 1.08% | 0.88% | 1.23:1 |
| 44% | 29% | 0.44% | 0.29% | 0.66% | 0.44% | 0.88% | 0.58% | 1.10% | 0.73% | 1.52:1 |
| 44% | 30% | 0.44% | 0.30% | 0.66% | 0.45% | 0.88% | 0.60% | 1.10% | 0.75% | 1.47:1 |
| 44% | 31% | 0.44% | 0.31% | 0.66% | 0.47% | 0.88% | 0.62% | 1.10% | 0.78% | 1.42:1 |
| 44% | 32% | 0.44% | 0.32% | 0.66% | 0.48% | 0.88% | 0.64% | 1.10% | 0.80% | 1.38:1 |
| 44% | 33% | 0.44% | 0.33% | 0.66% | 0.50% | 0.88% | 0.66% | 1.10% | 0.83% | 1.33:1 |
| 44% | 34% | 0.44% | 0.34% | 0.66% | 0.51% | 0.88% | 0.68% | 1.10% | 0.85% | 1.29:1 |
| 44% | 35% | 0.44% | 0.35% | 0.66% | 0.53% | 0.88% | 0.70% | 1.10% | 0.88% | 1.26:1 |
| 45% | 29% | 0.45% | 0.29% | 0.68% | 0.44% | 0.90% | 0.58% | 1.13% | 0.73% | 1.55:1 |
| 45% | 30% | 0.45% | 0.30% | 0.68% | 0.45% | 0.90% | 0.60% | 1.13% | 0.75% | 1.50:1 |
| 45% | 31% | 0.45% | 0.31% | 0.68% | 0.47% | 0.90% | 0.62% | 1.13% | 0.78% | 1.45:1 |
| 45% | 32% | 0.45% | 0.32% | 0.68% | 0.48% | 0.90% | 0.64% | 1.13% | 0.80% | 1.41:1 |
| 45% | 33% | 0.45% | 0.33% | 0.68% | 0.50% | 0.90% | 0.66% | 1.13% | 0.83% | 1.36:1 |
| 45% | 34% | 0.45% | 0.34% | 0.68% | 0.51% | 0.90% | 0.68% | 1.13% | 0.85% | 1.32:1 |
| 45% | 35% | 0.45% | 0.35% | 0.68% | 0.53% | 0.90% | 0.70% | 1.13% | 0.88% | 1.29:1 |
| 46% | 29% | 0.46% | 0.29% | 0.69% | 0.44% | 0.92% | 0.58% | 1.15% | 0.73% | 1.59:1 |
| 46% | 30% | 0.46% | 0.30% | 0.69% | 0.45% | 0.92% | 0.60% | 1.15% | 0.75% | 1.53:1 |
| 46% | 31% | 0.46% | 0.31% | 0.69% | 0.47% | 0.92% | 0.62% | 1.15% | 0.78% | 1.48:1 |
| 46% | 32% | 0.46% | 0.32% | 0.69% | 0.48% | 0.92% | 0.64% | 1.15% | 0.80% | 1.44:1 |
| 46% | 33% | 0.46% | 0.33% | 0.69% | 0.50% | 0.92% | 0.66% | 1.15% | 0.83% | 1.39:1 |
| 46% | 34% | 0.46% | 0.34% | 0.69% | 0.51% | 0.92% | 0.68% | 1.15% | 0.85% | 1.35:1 |
| 46% | 35% | 0.46% | 0.35% | 0.69% | 0.53% | 0.92% | 0.70% | 1.15% | 0.88% | 1.31:1 |
| 47% | 29% | 0.47% | 0.29% | 0.71% | 0.44% | 0.94% | 0.58% | 1.18% | 0.73% | 1.62:1 |
| 47% | 30% | 0.47% | 0.30% | 0.71% | 0.45% | 0.94% | 0.60% | 1.18% | 0.75% | 1.57:1 |
| 47% | 31% | 0.47% | 0.31% | 0.71% | 0.47% | 0.94% | 0.62% | 1.18% | 0.78% | 1.52:1 |
| 47% | 32% | 0.47% | 0.32% | 0.71% | 0.48% | 0.94% | 0.64% | 1.18% | 0.80% | 1.47:1 |
| 47% | 33% | 0.47% | 0.33% | 0.71% | 0.50% | 0.94% | 0.66% | 1.18% | 0.83% | 1.42:1 |
| 47% | 34% | 0.47% | 0.34% | 0.71% | 0.51% | 0.94% | 0.68% | 1.18% | 0.85% | 1.38:1 |
| 47% | 35% | 0.47% | 0.35% | 0.71% | 0.53% | 0.94% | 0.70% | 1.18% | 0.88% | 1.34:1 |
| 48% | 29% | 0.48% | 0.29% | 0.72% | 0.44% | 0.96% | 0.58% | 1.20% | 0.73% | 1.66:1 |
| 48% | 30% | 0.48% | 0.30% | 0.72% | 0.45% | 0.96% | 0.60% | 1.20% | 0.75% | 1.60:1 |
| 48% | 31% | 0.48% | 0.31% | 0.72% | 0.47% | 0.96% | 0.62% | 1.20% | 0.78% | 1.55:1 |
| 48% | 32% | 0.48% | 0.32% | 0.72% | 0.48% | 0.96% | 0.64% | 1.20% | 0.80% | 1.50:1 |
| 48% | 33% | 0.48% | 0.33% | 0.72% | 0.50% | 0.96% | 0.66% | 1.20% | 0.83% | 1.45:1 |
| 48% | 34% | 0.48% | 0.34% | 0.72% | 0.51% | 0.96% | 0.68% | 1.20% | 0.85% | 1.41:1 |
| 48% | 35% | 0.48% | 0.35% | 0.72% | 0.53% | 0.96% | 0.70% | 1.20% | 0.88% | 1.37:1 |
| 49% | 29% | 0.49% | 0.29% | 0.74% | 0.44% | 0.98% | 0.58% | 1.23% | 0.73% | 1.69:1 |
| 49% | 30% | 0.49% | 0.30% | 0.74% | 0.45% | 0.98% | 0.60% | 1.23% | 0.75% | 1.63:1 |
| 49% | 31% | 0.49% | 0.31% | 0.74% | 0.47% | 0.98% | 0.62% | 1.23% | 0.78% | 1.58:1 |
| 49% | 32% | 0.49% | 0.32% | 0.74% | 0.48% | 0.98% | 0.64% | 1.23% | 0.80% | 1.53:1 |
| 49% | 33% | 0.49% | 0.33% | 0.74% | 0.50% | 0.98% | 0.66% | 1.23% | 0.83% | 1.48:1 |
| 49% | 34% | 0.49% | 0.34% | 0.74% | 0.51% | 0.98% | 0.68% | 1.23% | 0.85% | 1.44:1 |
| 49% | 35% | 0.49% | 0.35% | 0.74% | 0.53% | 0.98% | 0.70% | 1.23% | 0.88% | 1.40:1 |

According to one aspect, the solution of PURAC CL 21/80 can be diluted to 1% by weight of PURAC CL 21/80. Thus, the 1% by weight solution of PURAC CL 21/80 can comprise from about 0.43% to about 0.49% by weight lactic acid and from about 0.29% to about 0.35% by weight citric acid. In a further aspect, the solution of PURAC CL 21/80 can be diluted to 1.5% by weight of PURAC CL 21/80. Thus, the 1.5% by weight solution of PURAC CL 21/80 can comprise from about 0.65% to about 0.74% by weight lactic acid and from about 0.44% to about 0.53% by weight citric acid. In a still further aspect, the solution of PURAC CL 21/80 can be diluted to 2% by weight of PURAC CL 21/80. Thus, the 2% by weight solution of PURAC CL 21/80 can comprise from about 0.86% to about 0.98% by weight lactic acid and from about 0.58% to about 0.7% by weight citric acid. In a yet another aspect, the solution of PURAC CL 21/80 can be diluted to 2.5% by weight of PURAC CL 21/80. Thus, the 2.5% by weight solution of PURAC CL 21/80 can comprise from about 1.08% to about 1.23% by weight lactic acid and from about 0.73% to about 0.88% by weight citric acid. In a further aspect, the solution of PURAC CL 21/80 can be diluted to 1-2.3% by weight PURAC CL 21/80.

In some aspects, the solution of PURAC CL 21/80 can consist essentially of lactic acid and citric acid in any of the disclosed amounts and ratios. According to this aspect, other substances can be present in the solution of PURAC CL 21/80 as long as those other substances do not materially affect the antimicrobial properties of the PURAC CL 21/80 solution. Thus, in one aspect, for example, other substances can be present in PURAC CL 21/80 solutions consisting essentially of lactic acid and citric acid in any of the disclosed amounts provided those other substances do not reduce the antimicrobial properties (e.g., ability to kill *Salmonella, E. coli*, or a combination thereof) of the solution by more than 10%.

Depending on the pH of the solution of PURAC CL 21/80, some of the lactic or citric acid can be present as lactate or citrate. The amounts of lactic acid and citric acid described herein contemplate that some of the acid may be in lactate or citrate form. Thus, in some aspects, depending on pH, PURAC CL 21/80 can comprise lactic acid and/or lactate in an amount ranging from about 43% to about 49% by weight and citric acid and/or citrate in an amount ranging from about 29% to about 35% by weight. Accordingly, when a PURAC CL 21/80 product is diluted to 1-2.5% by weight, the solution of PURAC CL 21/80 can comprise lactic acid and/or lactate in an amount ranging from about 0.43% to 1.23% by weight and citric acid and/or citrate in an amount ranging from about 0.29% to about 0.88% by weight.

In one aspect, the pH of the solution applied to the pathogenic bacteria, e.g., *Salmonella, E. coli*, or a combination thereof, or to a meat product contaminated with such pathogenic bacteria, can be basic. For example, PURAC CL 21/80 can be slightly buffered with potassium hydroxide or another suitable base such that a pH ranging from about 2 to about 2.2 is maintained in a 10% solution of PURAC CL 21/80 in water.

The PURAC CL 21/80 product can in some aspects comprise potassium in an amount ranging from about 1.2-1.5% by weight. The density of PURAC CL 21/80 at 20° C. can range from about 1.28-1.30 g/mL. PURAC CL 21/80 can contain other impurities, including for example, chlorides up to 20 mg/kg, sulfates up to 10 mg/kg, iron up to 10 mg/kg, heavy metals up to 5 mg/kg, and lead up to 0.5 mg/kg.

According to one aspect, PURAC CL 21/80 solutions comprising lactic and citric acids in any of the disclosed amounts can be used to treat a meat such as poultry. FIG. 1 depicts an exemplary production process for harvesting and processing poultry for market in accordance with a disclosed method. Live chickens can be brought into the production plant in crates. The chickens can be removed from the crates and hung upside down. In that position, their throats can be severed, so that the blood can drain thoroughly. The carcasses can then be put in a scalding tank where they can be treated for about 5-7 minutes with water at about 138-142° F. The scalding prepares the carcass for removal of the feathers. The scalding tank can promote cross-contamination of poultry entering the tank by contact with water contaminated by bacteria from previously processed poultry. The poultry can then be sent to one or more "pluckers," available in various configurations, for removal of the feathers. The de-feathered carcasses can be rinsed with potable water, also at about 138-142° F. The hot water rinse assists in final removal of any residual feathers.

The carcasses can then be placed on an automated evisceration and inspection line. Along the line the poultry are eviscerated, any remaining heads are removed, and parts that appear visibly contaminated can be cut off. The carcasses can then be subjected to a final rinse with water at ambient temperature. After the plucking step and the hot water rinse, the de-feathered carcasses can subjected to an antimicrobial spray using a solution of PURAC CL 21/80 as described herein. The spray can be applied for about 1 to 6 seconds to each carcass as the carcasses pass through a spray booth. This process step (i.e., antimicrobial spray following plucking) alone resulted in a reduction of about 30% in the incidence of *Salmonella* on carcasses treated to this same point (i.e., hot water rinse after plucking) according to a conventional process. According to a further aspect, the antimicrobial PURAC CL 21/80 spray can be applied after plucking but before the hot water rinse.

Following the initial antimicrobial treatment with PURAC CL 21/80, the carcasses can be placed on the evisceration line and processed. According to one aspect, it can be useful to again apply a solution of PURAC CL 21/80 in the post-evisceration antimicrobial control. One non-limiting method of applying the PURAC CL 21/80 solution is to use a "dip." The carcasses can be placed in the dip for about 10 seconds to approximately one minute. The bath can be monitored to make sure that the concentration of PURAC CL 21/80 remains in a range of from about 1% to about 2.5% by weight. If the concentration exceeds 2.5%, in some aspects, the carcasses may develop an undesirable gray color and objectionable odor. One way to help control the concentration of PURAC CL 21/80 is to slowly feed, e.g., "drip," antimicrobial solution into the dip tank. Alternatively, the antimicrobial solution can be added to the tank and blended with water to the desired concentration. The concentration can be monitored about every 15-20 minutes to ensure that the concentration is maintained at a suitable level. The use of the antimicrobial PURAC CL 21/80 dip results in a 90% reduction in *Salmonella*, i.e., 90% of the poultry carcasses with *Salmonella* before treatment can be *Salmonella*-free after treatment.

Following the antimicrobial PURAC CL 21/80 dip, a rinse can be carried out using potable water or any other USDA approved final rinse step, such as chlorinated water, within the approved concentration(s). In the case of a chlorinated water rinse, a typical concentration is between about 20-50 ppm. Each carcass can be subjected to the spray for between about 1 to 6 seconds. After the treatment with the aqueous chlorine spray, the carcasses can be sent into an air chiller. In the event that the production facility uses an ice bath for chilling, the chlorine (or other USDA approved substance at proper concentration(s)) can be added to the ice bath rather than using a separate spray.

In a further aspect, the PURAC CL 21/80 solutions comprising lactic and citric acid in any of the disclosed amounts can be used to treat beef and other non-poultry meats, e.g., pork, lamb, goat, rabbit, among others. The disclosed PURAC CL 21/80 solutions can be used on livestock carcasses both pre-chill and post-chill and in addition can be used on offal and variety meats. The PURAC CL 21/80 solutions (1-2.5%) can be used on beef and pork primals and trimmings at 55° C., according to one aspect. In one aspect, the PURAC CL 21/80 solutions can be applied at 2-2.5 wt. % to the brushes in the spray cabinets used on beef heads and tongues.

The disclosed PURAC CL 21/80 solutions can be applied at different places in the meat packing plant. One point of application is immediately after carcass wash. Another point of application is in the hot box. Some meat packing plants currently employ multiple contaminant hurdles (e.g., application of antimicrobial products, washing, and the like) at various points in the meat processing, and the application of PURAC CL 21/80 can be used as part of one of those steps. In other words, the disclosed solutions of PURAC CL 21/80 can be the principal antimicrobial treatment or can be used with other processing steps.

When the PURAC CL 21/80 solutions are used in the post-processing of meat, one non-limiting method of application is to spray the meat before cutting or needling. In commercial applications, this can occur at a spray station as the meat passes on a conveyor. It can also be desirable to again apply the antimicrobial PURAC CL 21/80 solution after the cutting or needling operation or to apply it on the cutting blade(s) or needles(s) prior to their contacting the meat.

A. EXAMPLES

The following examples are put forth so as to provide those of ordinary skill in the art with a complete disclosure and description of how the methods claimed carried out and evaluated, and are intended to be purely exemplary and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. The Examples are provided herein to illustrate the disclosure, and should not be construed as limiting in any way.

1. Example 1

A test was performed on commercially processed chicken carcasses to determine the antimicrobial efficacy of a post-evisceration dip employing a solution of citric acid and lactic acid (PURAC CL21/80) in a post-evisceration, dip tank. The production line from which the sample carcasses were obtained utilized a process as shown in FIG. 1.

Seventy-five chicken carcasses were removed from the production line post evisceration. Twenty-five poultry were evaluated at this stage by a USDA certified laboratory for aerobic plate counts ("APC"), generic *E-coli*, and the presence or absence of *Salmonella* spp. Of the twenty-five carcasses, ten were evaluated for APC and *E-coli* and all twenty-five for *Salmonella* spp.

The remaining fifty carcasses were then processed in a dip tank containing a solution of PURAC CL 21/80. The solution was monitored and maintained within a target concentration of 1.80% to 2.00%. The actual concentrations in the dip tank varied from 1.80% to 2.04% throughout the study period. The concentration was monitored by periodic taking a sample of a known size from the solution and titrating the sample on site. The chicken carcasses were treated in the dip for approximately 60 seconds. Ten chicken carcasses were then evaluated for APC and *E-coli* (10 carcasses), and all 25 carcasses were evaluated for the presence of *Salmonella* spp. The remaining twenty-five chicken carcasses were sent to the chiller and then examined for *Salmonella* spp.

The chicken carcasses were rinsed in accordance with the Microbiology Laboratory Guidebook, Chapter 4.03, Section 4.5.7 Whole Bird Rinses, published by the United States Department of Agriculture ("USDA"). The carcasses were rinsed with 400 mL of Butterfield's Phosphate Diluent as described in the note; this was done in order to also evaluate APC and generic *E. coli* values from the rinse solution for each bird.

Upon arrival at the laboratory the chicken rinses were processed for the evaluation of APC, generic *E. coli* and *Salmonella* spp. APC were prepared and evaluated in accordance with the Food and Drug Administration's Bacteriological Analytical Manual ("FDA-BAM"), 8th Edition, Revision A, 1998. Generic *E. coli* were prepared and evaluated in accordance with AOAC Official Method of Analysis 991.14. AOAC Official Method of Analysis 996.08 was performed to analyze the chicken rinses for the presence or absence of *Salmonella* spp.

The data and cumulative results for APC and *E-coli* pre-dip and post-dip are shown in Table 1. The data for *Salmonella* spp. pre-dip, post-dip and post chiller are shown in Table 2. (The data for APC and *E. coli* in a given row in the table represents the test data for a single sample bird pre-dip and a single sample bird post-dip.)

TABLE 1

|  | APC (pre-dip) Log order CFU/mL | APC (post-dip) Log order CFU/mL | E. coli (pre-dip) Log order CFU/mL | E. coli (post-dip) Log order CFU/mL |
| --- | --- | --- | --- | --- |
|  | 5.56 | 2.94 | 2.81 | 0.00 |
|  | 5.68 | 2.99 | 3.04 | 1.04 |
|  | 5.79 | 3.08 | 2.40 | 0.00 |
|  | 5.40 | 2.81 | 3.15 | 0.95 |
|  | 5.49 | 2.72 | 3.11 | 0.78 |
|  | 5.54 | 2.89 | 2.84 | 0.00 |
|  | 5.46 | 2.77 | 2.92 | 0.30 |
|  | 5.83 | 3.00 | 2.75 | 0.00 |
|  | 5.62 | 2.83 | 3.00 | 0.60 |
|  | 5.43 | 2.81 | 2.57 | 0.00 |
| Average Log 10 | 5.58 | 2.88 | 2.86 | 0.37 |

The lactic acid blend demonstrated a 2.32 to 3.12 log 10 reduction in aerobic plate counts and generic *E. coli* counts showed a 1.36 to 3.15 log 10 reduction (See Table 1.) Five of 10 the chicken rinses had generic *E. coli* counts of less than 10 colony forming units/ml (CFU/ml); these are represented by the 0.00 in the *E. coli* (post-lactic) column of Table 1. These figures represent the bacterial loads after the IOBW and prior to the chilling of the chicken carcasses.

TABLE 2

|  | # Positive | % Positive | # Negative | % Negative |
| --- | --- | --- | --- | --- |
| Pre-dip | 23 | 92 | 2 | 8 |
| Post-dip | 1 | 4 | 24 | 96 |
| Post-Chill | 1 | 4 | 24 | 96 |

Of the twenty-five carcasses rinsed at the pre-antimicrobial blend interval (after IOBW, prior to dip tank) twenty-three of the chicken rinses tested positive for *Salmonella* spp. After exposure to the antimicrobial blend in the dip tank, (post-lactic, pre-chill) only one of the chicken rinses tested positive, with the remaining twenty-four carcasses being negative for *Salmonella* spp. At the post-chill interval twenty-four out of the twenty-five tested negative, with only one being positive (See Table 2.). Although no further confirmation testing was performed, the screen procedure used in this study has a high sensitivity for meat products with 99% specificity. Certain strains of *Citrobacter* or *Hafnia* have showed some cross-reactivity with the screening method utilized. The results from this study indicate that the use of a citric acid/lactic acid blend in a dip tank system is effective in the reduction of pathogenic bacteria including *Salmonella*.

2. Example 2

Tests were performed to determine the efficacy of using a mixture of citric acid and lactic acid in solution on commercially processed chickens at various points in the poultry harvesting process. The solution contained approximately 2.5% of PURAC CL21/80.

Sample chicken carcasses were obtained from a production line utilizing a process as shown in FIG. 1. Sample carcasses were removed from the production process and were treated with the antimicrobial solution as shown in Table 3 and the following description. Spray times were what it took to completely cover the bird with solution and dip times were what it took to manually dunk the bird in a bucket and pull it out. In each case contact time was about 1 to 6 seconds.

Sample 16 (pre-evisceration) was placed in a 5 gallon bucket containing a 2.5% solution of PURAC CL21/80. The sample was dipped down and then brought back to the surface for a residence time of about 1 to 6 seconds in the solution. Sample 18 was sprayed with a solution of CL21/80 using a pump sprayer as the carcass was rotated and covered well with the solution. The dip was the same as for sample 16. Sample 20 was a control sample taken after the plucker. Sample 21 was a control sample taken just before entering the chiller. It had been sprayed using a combination of citric acid and sodium chlorite sold under the trademark SANOVA by Alcide Corporation, Redmond, Wash. and now a part of Ecolab, Inc., St. Paul, Minn.). Sample 22 (post-evisceration) was taken from a different place on the line, but treated the same as sample 18. Sample 23 was sprayed with Purac CL21/80 pre-evisceration and dipped in a 20 ppm chlorine dioxide solution post-evisceration.

TABLE 3

| (Sample Carcass) | Treatment with 2.5% CL 21/80 | Analysis | Method | Results CFU/gram |
|---|---|---|---|---|
| 16 | Single dip - pre-evisceration | Aerobic Plate Count | FDA BAM | 42,000 |
| 16 | — | Coliform | AOAC | 90 |
| 18 | Pre-evisceration spray and post-evisceration dip | Aerobic Plate Count | FDA BAM | <10 |
| 18 | | Coliform | AOAC | <10 |
| 20 | Control - no treatment | Aerobic Plate Count | FDA BAM | 260,000 |
| 20 | | Coliform | AOAC | 860 |
| 21 | — | Aerobic Plate Count | FDA BAM | 130,000 |
| 21 | — | Coliform | AOAC | 1,200 |
| 22 | Post-evisceration spray | Aerobic Plate Count | FDA BAM | 49,000 |
| 22 | — | Coliform | AOAC | 400 |
| 23 | Pre-evisceration spray and post evisceration chlorine dioxide dip | Aerobic Plate Count | FDA BAM | 170,000 |
| 23 | — | Coliform | AOAC | 780 |

3. Example 3

A test was performed to determine the efficacy of using a 2.5% solution of citric acid and lactic acid (PURAC CL21/80) as a spray on commercially processed chicken carcasses pre-evisceration. Sample carcasses were removed from the production process and sprayed for approximately 1 to 6 seconds with the antimicrobial solution. The results are shown in Table 4. The APC was determined utilizing the FDA BAM method. All other tests results were obtained using AOAC.

TABLE 4

| (Sample Carcass) | Aerobic Plate Count (CFU/mL) | Coliform (CFU/mL) | Mold Count (CFU/mL) | Yeast Count (CFU/mL) |
|---|---|---|---|---|
| 1 (CL21/80 A) | 900 | 80 | <10 | 20 |
| 2 (CL21/80 B) | 1,800 | 60 | <10 | <10 |
| 3 (Control A) | 23,000 | 620 | 20 | <10 |
| 4 (Control B) | 146,000 | 810 | 30 | 10 |

4. Example 4

A study was performed by an independent laboratory to verify the effectiveness of using a solution of citric acid and lactic acid (PURAC CL21/80) to reduce *Escherichia coli* 0157:H7 and *Salmonella* in beef. In particular, the study used USDA Select, beef tips (Beef Bottom Sirloin Butt, Tri-Tip, Boneless IMPS 185C) which were obtained directly from a commercial processing facility, i.e., a meat packing plant, and then transported to a pathogen processing facility.

Upon arrival, loins were fabricated for uniformity and inoculated with either a cocktail mixture of *E. coli* 0157:H7 or *Salmonella* (two separate inoculations) by dipping the sub-primals in a pathogen inoculated buffer solution at a 104 cfu/ml (high). A total of 5 tips/treatment/pathogen were prepared for a total of 30 tips as follows: Five samples of non-inoculated control (NC); Five samples of non-inoculated with treatment spray (NT); Five samples of *Escherichia coli* 0157:H7 control (EC); Five samples of *Escherichia coli* 0157:H7 treated (BT); Five samples of *Salmonella* control (SC); Five samples of *Salmonella* treated (ST).

Inoculated tips were placed on stainless steel racks and held at refrigerated temperatures (approximately 4° C.) for one hour to facilitate "attachment." After the attachment period, one-half of the inoculated samples were treated with the solution of citric and lactic acids. The solution was placed into a trim sanitizing spray cabinet. The beef tips were moved along by chain at the rate of one foot per 2.5 seconds. Equipment was cleaned and sanitized between each sample and treatment combination. The antimicrobial solution was employed at a concentration of 2.5 wt. %. and at a temperature of approximately 77° F. The solution was applied at a rate of about 0.66 gallons per minute for about 1.5 to 1.75 seconds. The spray cabinet had six nozzles of size 1101.5 each.

The controls and treated samples were then subjected to microbiological analysis. The external surface of each of the tips was swabbed (100 cm$^2$ area) to determine pathogen loads on the surface of the product. The swab was placed into a sterile whirl pack bag with 10 mL of peptone buffer. Appropriate dilutions and plating followed. The non-inoculated control and non-inoculated treatment were serially diluted and plated onto MAC and APC agar. The samples containing *E. coli* 0157:H7 were serially diluted using peptone dilution blanks and plated onto MSA with a thin-layer of TSA for cell recovery to detect total numbers remaining on the product. Samples containing *Salmonella* were serially diluted and plated onto XLD agar with a thin-layer of TSA for cell recovery to determine the survival of the *Salmonella*.

The data was then analyzed statistically using a descriptive analysis in SAS program. If a plate revealed no colonies, a count of one cfu/100 cm$^2$ was recorded in the data set for statistical program analysis purposes. The study revealed the following results: The beef tips had an initial aerobic plate count of log 3.5 cfu/100 cm$^2$ and a generic *Escherichia coli* count of log 1.5 cfu/100 cm$^2$. After the beef tips were dipped into the solution of citric and lactic acids, the aerobic plate counts decreased by 1.5 logs while the generic *Escherichia coli* decreased by 0.4 logs. For pathogen recovery, the beef tips were inoculated to log 5.5 c in/100 cm$^2$ with *Escherichia coli* O157:H7 and *Salmonella*. After treatment, the *Escherichia coli* O157:H7 was reduced by 1.4 logs and the *Salmonella* species by 1.1 logs.

5. Example 5

The use of a solution of citric and lactic acids (PURAC CL21/80) to reduce the incidence of *E-coli* and *Salmonella* was also verified in a experimental test at a commercial slaughtering facility that normally used a solution of 5 wt. % lactic acid applied to full carcasses on the kill floor. As an alternative to the lactic acid treatment, the plant used a 2.5 wt. % solution of citric and lactic acids also applied on the kill floor during its normal production for a period of several days. Routine quality control tests were performed to detect the presence of both *Salmonella* and *E-coli* on the treated meat. The results were at least as good as those normally achieved with lactic acid alone at higher concentration levels.

Other examples are described in U.S. Provisional Application No. 61/274,282, filed Aug. 14, 2009, U.S. Non-Provisional application Ser. No. 12/806,317, filed Aug. 10, 2020, U.S. Non-Provisional application Ser. No. 15/941, 880, filed Mar. 20, 2018 (now U.S. Pat. No. 10,834,933), and U.S. Non-Provisional application Ser. No. 16/443,646 (filed Jun. 17, 2019). Each of these documents is incorporated by reference in its entirety, including each document's teachings of examples.

It will be apparent to those skilled in the art that various modifications and variations can be made without departing from the scope or spirit of this disclosure. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of killing pathogenic bacteria, the method comprising contacting the pathogenic bacteria with a solution comprising lactic acid in an amount ranging from about 0.43% to 1.23% by weight and citric acid in an amount ranging from about 0.29% to about 0.88% by weight.

2. The method of claim 1, wherein the pathogenic bacteria is *Salmonella, Escherichia coli*, or a combination thereof.

3. The method of claim 1, wherein the pathogenic bacteria is present on a meat.

4. The method of claim 3, wherein the meat is poultry.

5. A method of reducing pathogenic bacteria contamination on meat, the method comprising treating the meat with a solution comprising lactic acid in an amount ranging from about 0.43% to 1.23% by weight and citric acid in an amount ranging from about 0.29% to about 0.88% by weight.

6. The method of claim 5, wherein the pathogenic bacteria is *Salmonella, E. coli*, or a combination thereof.

7. A method of killing *Salmonella*, the method comprising contacting the *Salmonella* with a solution comprising lactic acid in an amount ranging from about 0.43% to 1.23% by weight and citric acid in an amount ranging from about 0.29% to about 0.88% by weight.

8. The method of claim 7, wherein the *Salmonella* is present on a meat product.

9. The method of claim 1, the solution consisting essentially of the lactic acid and the citric acid.

10. The method of claim 5, the solution consisting essentially of the lactic acid and the citric acid.

11. The method of claim 7, the solution consisting essentially of the lactic acid and the citric acid.

* * * * *